United States Patent [19]

Massey, Jr.

[11] Patent Number: 4,716,624
[45] Date of Patent: Jan. 5, 1988

[54] POULTRY CUTTING SUPPORT

[76] Inventor: George W. Massey, Jr., Box 774, Starr, S.C. 29684

[21] Appl. No.: 37,213

[22] Filed: Apr. 10, 1987

[51] Int. Cl.$^4$ ............................................. A22C 21/00
[52] U.S. Cl. ....................................... 17/11; 17/44.1; 17/1 G
[58] Field of Search ................... 17/11, 46, 44.1, 1 G; 269/289

[56]  References Cited
U.S. PATENT DOCUMENTS 3,837,634  9/1974  Cobb .................................. 269/289
4,385,419  5/1983  Cantrell .................................. 17/11

Primary Examiner—Willie G. Abercrombie
Attorney, Agent, or Firm—Bailey & Hardaway

[57] ABSTRACT

A cutting support is illustrated in use on a poultry deboning conveyor and the like as having a plastic cutting shell with a conical wall open at the bottom and a sealing means carried at an upper portion of the conical wall positionable upon a conical fixture in upright position to receive a body cavity of poultry so as to be accessible to an operator for manual deboning. An important object is to make a removable and inexpensive way to debone poultry in the most sanitary means.

7 Claims, 4 Drawing Figures

POULTRY CUTTING SUPPORT

BACKGROUND OF THE INVENTION

Apparatus has been provided for positioning poultry for deboning both in manual as well as mechanical operations. An upright conical support has been provided for positioning poultry for manual deboning operations, and such may be positioned upon a driven conveyer as illustrated in U.S. Pat. No. 4,385,419.

Conical supports such as illustrated in the patent have the disadvantage of requiring frequent replacement in that the plastic becomes cut due to repeated actions of the manually operated knife. All parts must be frequently cleaned by thorough washing, and greater frequencies of washing are required where the customary ultra high molecular weight polyethylene is used for the conical support or "horn", because such is relatively soft and the steel knives cut or gouge out the plastic leaving places which are difficult to clean requiring frequent replacement. The permanent cone members are expensive because they are machined rather than of moldable plastic. If the conical member is stainless steel, then such are expensive and introduce a wear factor in working with the manually operated knives.

Such manual operations may be facilitated wherein the conical elements are provided with removable plastic cutting shells constructed of molded high molecular weight polyethylene. Such plastic is less expensive and the shells are readily replaceable. Since the plastic is relatively hard, such may impart a sharpening action to the knives and requires less frequent replacement since there is less tendency for the shells to become gouged out. These conical elements and the shells carried thereon may be mounted on stationary supports or upon conveyer mounted supports as illustrated in the patent.

Accordingly, it is an important object of this invention to provide a molded plastic shell for protecting a permanent cone for use in deboning poultry constructed of high density polyethylene such as may be scratched but not gouged out like ultra high molecular weight polyethylene. Additionally, it is an important object of the present invention to provide an inexpensive plastic shell which may be useful upon conical supports customarily used for manually deboning poultry.

Another important object of this invention is the provision of a plastic shell which may be utilized for making a poultry deboning operation more sanitary and require less cleaning than is the case with the permanent fixture alone.

SUMMARY OF THE INVENTION

It has been found that a cutting support may be provided for use on a poultry deboning conveyer and the like utilizing a molded shell constructed of high density polyethylene and the like having a conical wall open at the bottom. A sealing means is carried at an upper portion of the conical wall receivable upon a conical fixture having an outer surface receiving an inner surface of the shell thereon. Means are provided for mounting the conical fixture in upright position wherein the shell extends into a body cavity positioning poultry so as to be accessible in an operation for manual deboning.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
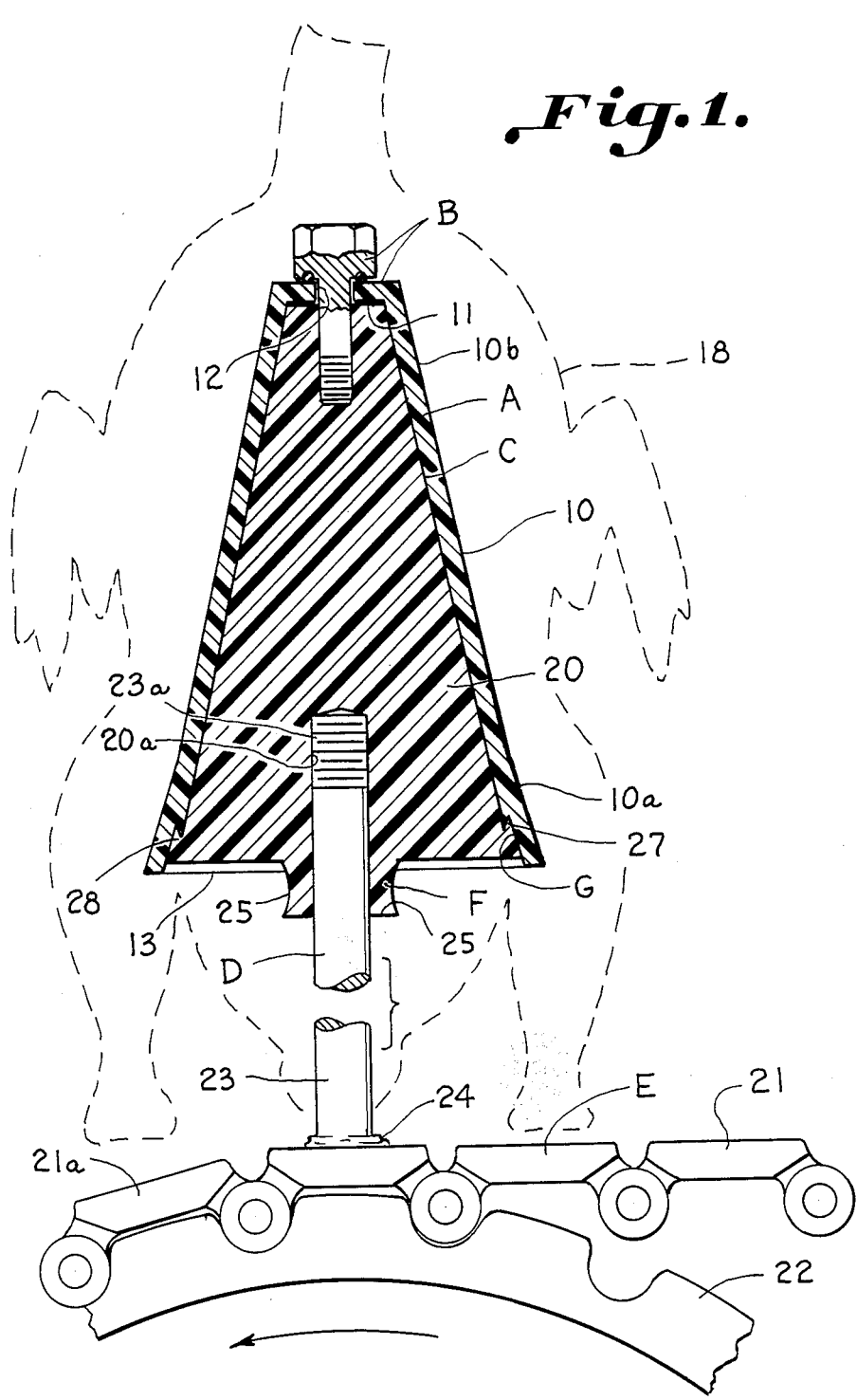
FIG. 1 is a longitudinal sectional elevation illustrating a poultry cutting support mounted upon a power driven conveyer and constructed in accordance with the present invention.
Figure 2:
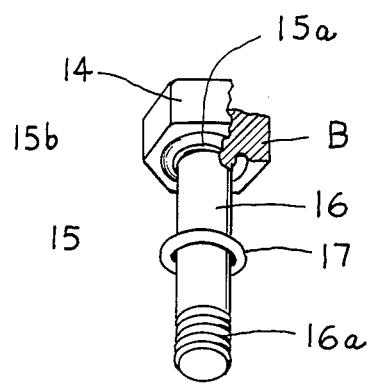
FIG. 2 is a perspective view illustrating sealing means including a threaded bolt carrying a deformable ring for engagement with an inner extending annular wall or flange at an upper portion of the conical shell.
Figure 3:
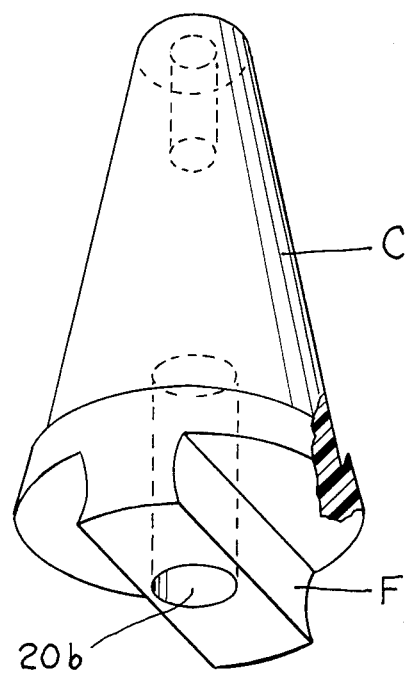
FIG. 3 is a perspective view illustrating a base member carried by the lower portion of the conical fixture for removing the conical fixture for cleaning.
Figure 4:
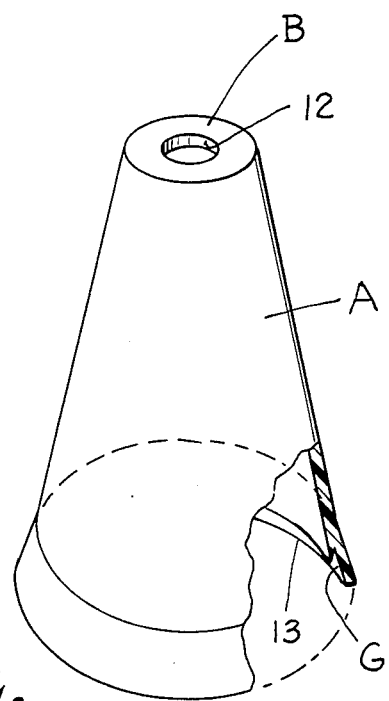
FIG. 4 is a perspective view of the conical shell looking toward an upper edge thereof.

The drawings illustrate a cutting support for use in deboning poultry including a molded plastic cutting shell having a conical wall A open at a bottom thereof. A sealing means B is carried at an upper portion of the conical wall. A conical fixture has an outer surface C receiving an inner surface of the shell thereon. Means D removably mounts the conical fixture in upright position wherein said shell extends into a body cavity positioning poultry so as to be accessible to an operator for manual deboning. A lower portion of the conical fixture is threadably mounted upon a poultry deboning conveyer. A base member F carried by the lower portion of the conical fixture is provided for accommodating a tool for removing the conical fixture from the deboning conveyer. An annular sealing member G is carried by a lower portion of the shell receivable on a lower portion of the conical fixture.

The annular sealing member includes an annular groove converging upwardly. The sealing means B carried at an upper portion of the conical wall includes an inwardly projecting annular wall integral with the conical wall, and a bolt having a threaded shank receivable within the annular wall securing said cutting shell snuggly upon the conical fixture. A head carried upon the threaded shank has a deformable sealing member bearing upon the annular wall.

The shell is preferably molded from a relatively hard plastic which may be suitably adapted to injection molding such as high molecular weight polyethylene.

The molded plastic cutting shell has a conical wall A having exterior conical surface 10 which forms a lower portion 10a which tapers outwardly a slightly greater amount than an upper portion 10b. A sealing means B includes an inwardly extending wall or flange 10 integral with the conical shell 10 and has an opening 12 therein to accommodate suitably fastening means. A lower portion of the conical shell is open at the bottom as at 13.

The sealing means B, in addition to the inner projecting flange 11, includes a bolt which is illustrated as having a hex head 14 with an annular groove 15 at a lower edge surrounding a threaded shank 16. The annular groove defines an inner flat shoulder 15a and an outer flat shoulder 15b, and a deformable member such as an O-ring or seal 17 is formed of a deformable resilient rubbery material of any desirable conventional construction. The threaded shank 16 has a lower threaded portion 16a. The deformable ring 17 as illustrated in FIG. 1 bears against an upper surface of the inner projecting flange 11 forming a seal at the top for limiting surfaces requiring cleaning while making the plastic molded cutting shell and associated parts readily removable for cleaning.

In FIG. 1 poultry such as a chicken is illustrated in broken lines as at 18. The cutting shell including the generally conical wall A and sealing means B is carried upon a permanent conical fixture having an outer surface C. The conical fixture may be provided as at a solid body 20 machined from any acceptable plastic material. The conical fixture is carried by suitable mounting means upon a driven or stationary conveyer having a belt 21 carried upon a sprocket 22 which affords driving means for the conveyer. The means for mounting the conical fixture C includes an upright rod 23 which is welded as at 24 to the conveyer or stationary flats 21a. An upper end of the rod 23 is threaded as at 23a to be received within an internally threaded bore 20a carried within a lower portion of the conical fixture 20. A base member F has elongated parallel sides 25 for accommodating a suitable gripping tool for removing the rod 23 from the bore 20b carried within the lower portion of the conical fixture.

An annular sealing member G is carried by a lower portion of the shell and includes a V-shaped groove 27 for accommodating an annular upward projecting flange 28 carried by a lower portion of the body 20 integrally therewith.

While a preferred embodiment of the invention has been described using specific terms, such description is for illustrative purposes only, and it is to be understood that changes and variations may be made without departing from the spirit or scope of the following claims.

What is claimed is:

1. A cutting support for use in deboning poultry comprising:
    a molded plastic cutting shell having,
    a generally conical wall open at a bottom thereof, and sealing means carried by an upper portion of said conical wall,
    a fixture receiving said shell thereon; and
    means removably mounting said fixture in upright position wherein said shell extends into a body cavity positioning poultry so as to be accessible to an operator for manual deboning.

2. The structure set forth in claim 1 wherein a lower portion of said fixture is threadably carried by said means removably mounting said fixture, and
    a base member carried by said lower portion of said fixture for accommodating a tool for removing said fixture from said means removably mounting said fixture.

3. The structure set forth in claim 1 wherein said means removably mounting said fixture is carried upon a poultry deboning conveyer.

4. The structure set forth in claim 1 wherein said fixture is generally conical including an annular sealing member carried by a lower portion of said shell receivable on a lower portion of said conical fixture.

5. The structure set forth in claim 4 wherein said annular sealing member includes an annular groove converging upwardly.

6. The structure set forth in claim 1 wherein said sealing means carried at an upper portion of said conical wall includes an inwardly projecting annular wall integral with said conical wall, and
    a bolt having a threaded shank receivable within said annular wall securing said cutting shell snuggly upon said conical fixture.

7. The structure set forth in claim 6 including a head carried upon said threaded shank having a deformable sealing member bearing upon said annular wall.

* * * * *